July 5, 1960

W. H. CINCEL 2,943,665

VALVE LOCK CAP

Filed Oct. 30, 1956

INVENTOR.
WALTER H. CINCEL
BY Jerome P. Bloom
HIS ATTORNEY

United States Patent Office 2,943,665
Patented July 5, 1960

2,943,665
VALVE LOCK CAP

Walter H. Cincel, Dayton, Ohio, assignor, by mesne assignments, to Joseph W. Gottschlich, Brookville, Ohio Filed Oct. 30, 1956, Ser. No. 619,238

17 Claims. (Cl. 152—431)

This invention relates to a valve lock cap and more particularly to an improved safety cap for the inflating valves of pneumatic tires, tubes and the like. It provides an improved lock assembly for positively capping a valve to prevent tampering therewith and includes a one-way valve to permit introduction of an inflating medium therethrough. As presented herein, the invention constitutes an improvement on my prior invention "Safety Cap for Inflating Valves," the subject of U.S. Patent application No. 548,091, filed November 21, 1955, now Patent No. 2,831,495.

Prior valve cap devices for similar application have proven inadequate. As applied to the inflating valves of pneumatic tires and tubes, they are particularly awkward to use and generally do not permit inflation unless they are first removed from the valve. Moreover, the prior art caps are readily removable and easily lost.

A primary object of the invention is to correct the deficiencies of the prior art lock cap devices and provide a simple but effective valve lock cap including improved means for positive locking thereof over a valve and incorporating a floating cap unit providing a one-way valve therein.

Another object of the invention is to provide an improved valve lock cap for the inflating valves of pneumatic devices, such as tires and tubes, which requires a special tool for removal thereof and is essentially tamperproof.

An additional object of the invention is to provide an improved safety cap means for locking over the inflating valve of a pneumatic tube or the like including means preventing escape of an inflating medium from the valve to which it is applied or providing for normal inflation therethrough.

Another object of the invention is to provide an improved safety cap for valves incorporating an improved tamper-proof housing assembly preventing removal thereof in absence of a special tool.

An additional object of the invention is to provide an improved lock cap for inflating valves including a floating cap unit which permits inflation through the valve to which it is applied yet prevents escape of inflating medium therefrom and further includes rotatable means preventing satisfactory engagement of the cap in absence of a special tool for removal thereof.

An additional object of the invention is to provide an improved valve lock cap particularly applicable to pneumatic tires and tubes which cannot be removed by manual means and incidentally incorporates hub cap lock means therein.

Another object of the invention is to provide a novel combination of an improved valve lock in conjunction with a special tool for removal thereof which incorporates a highly advantageous clip preventing a loss thereof.

A further object of the invention is to provide an improved lock cap for valves possessing the advantageous structural features, the inherent meritorious characteristics, and the mode of operation herein mentioned.

With the above and other objects in view as will more fully appear in the specification, the invention intended to be protected by Letters Patent consists of the features of construction, the parts and combinations thereof and the mode of operation as hereinafter described or illustrated in the accompanying drawings or their equivalents.

Referring to the drawings wherein is found one, but obviously not necessarily the only form of embodiment and application of the invention:

Figure 1:
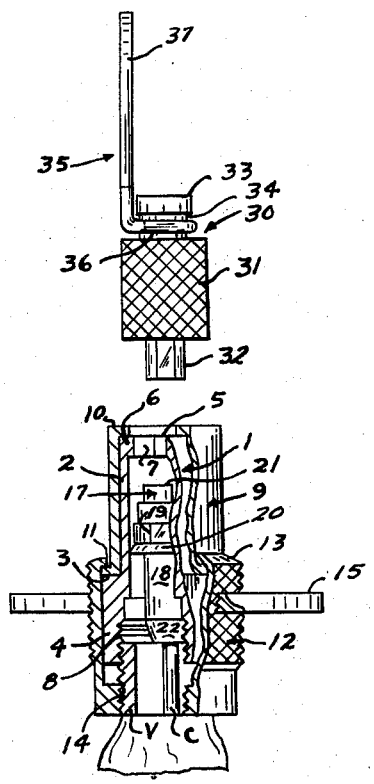
Fig. 1 is an elevation view of the valve lock cap assembly provided by the invention, shown partially in section.

The invention can be best described with particular reference to the embodiment and application shown in the drawings. As shown, the valve lock cap unit consists of an operating cylinder 1 which has a section 2 reduced in external diameter to one end thereof which constitutes its outer end. The other and inner end section 4 of the cylinder 1 is relatively expanded to provide an external shoulder 3 intermediate the extremities of the cylinder. An internal radial flange 6 formed on the outer extremity 5 of section 2 defines a hexagonal opening 7 in the outer end of the cylinder. The section 4 is internally expanded and internally threaded at 8 therein. A sleeve 9 having an internal flange 10 at one end and an external flange 11 at the other end rotatably mounts over and about the outer end section 2 of the cylinder 1 to have the inner surface of the flange 10 overlap the internal flange 6 at the outer end of the cylinder so as to outline the hexagonal opening 7 defined thereby. The external flange 11 at the other extremity of the sleeve bearingly abuts the shoulder 3 on the cylinder and has a radial extent substantially co-extensive therewith.

A cylindrically formed housing 12 rotatably mounts about the inner end 4 of the cylinder 1 and the flange 11 on the sleeve 9 to have one extremity 13 flared over the flange 11 in containing bearing relation thereto and retaining it in bearing relation to the shoulder 3 on cylinder 1. The other end of the housing 12 is relatively reduced in internal diameter at 14. This relatively reduced portion 14 is internally threaded and has a dimension identical with that of the internally threaded portion 8 on the adjacent end of the cylinder 1. The external surface of the housing 12 adjacent its flared over extremity 13 is knurled and a ring member 15 is pressed over the knurled portion of the cylinder 12 to project radially therefrom in a fixed position adjacent the flared over end 13 which rotatably mounts over the flange 11 on sleeve 9. Thus, the cylinder 1 is rotatably confined by the sleeve 9 and the housing 12 and the sleeve 9 is rotatably confined to the cylinder 1 by the housing 12. The axial extent of the cylindrical housing 12 relative the contained inner end 4 of the cylinder 1 and the flange 11 of sleeve 9 is such that the cylinder 1 and sleeve 9 may move axially therein between the flared extremity 13 and the internally reduced end portion 14 thereof.

A cap plunger assembly 17 is provided in floating relation internally of the cylinder 1. This assembly 17 includes a plunger pin 18 having a radially projecting flange 19 adjacent the outer end thereof as disposed in the cylinder 1. Flange 19 is of lesser radial extent than the inner dimension of the cylinder 1. A shoulder is provided thereby on pin 18 inwardly of the cylinder against which a conically disposed flexible ring 20 of rubberized fabric abuts as it is mounted about the body of the pin 18 in sealing relation thereto. The flexible ring 20 is so mounted about the pin to diverge inwardly of the cylinder 1 and to peripherally bear on the inner surface thereof. This ring 20 thus provides a one-way valving action within the cylinder 1 as will be described. The outer end 21 of the pin 18 is reduced in diameter and concentrically exposed for access through the aligned openings provided in the outer end of the cylinder by the flanges 6 and 10. The inner end 22 of the pin 18 is beveled peripherally.

A special tool is provided for operating the lock cap unit. This tool is in the form of a wrench and consists of an integral cylindrical body 30 centrally expanded at 31 throughout the major portion thereof intermediate its ends. The one end 32 is relatively reduced in external diameter and formed to provide a short hexagonal surfaced extension. The other end 33 is similarly reduced in external diameter and provided with a groove 34 therein immediately adjacent the body section 31. A wire clip 35 is provided engaged to the body 30 in the groove 34. This clip 35 is simply and readily formed for use with the body element 30. The engaging end of the wire clip element 35 is bent at right angles to its major extent to provide a U-shaped clip extremity 36 lying in a plane at right angles to the balance of the wire clip element. This right angled portion receives the reduced portion of the extremity 33 of the body 30 by frictionally engaging thereabout in the groove 34 therein. The major portion of the clip extends in a plane at right angles to the plane of the U-shaped extremity thereof and is looped over to reverse upon itself to form an upper clip engaging loop 37.

Figure 2:
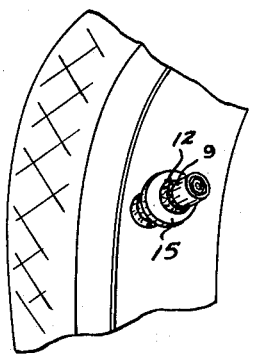
Fig. 2 is a fragmentary perspective view of the valve lock cap of Fig. 1 in application to a pneumatic tire assembly.
Figure 3:
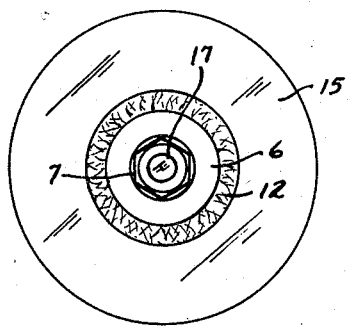
Fig. 3 is a top view of the valve lock cap unit provided in Fig. 1.
Figure 4:
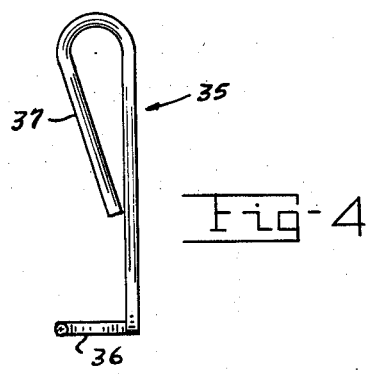
Fig. 4 is an elevation of the clip element employed in conjunction with the special operating tool illustrated in the assembly of Fig. 1.

The lock cap of the invention may be applied, for example, to the inflating valve of a pneumatic tire as shown in Figs. 1 and 2 of the drawings. The internally threaded extremity 14 of rotatable housing 12 is first threadedly engaged about the tire valve housing V and screwed down until the inner end of cylinder 1 abuts the outer end of the tire valve. The hexagonally shaped extension 32 of wrench 30 is then applied within the hexagonal opening 7 in the outer end of the cylinder 1. On rotating the wrench, the internally threaded inner end of cylinder 1 is threadedly engaged about the valve housing V until it abuts the internal shoulder provided by the internally reduced end of the housing 12 to lock the housing 12 to the tire valve. The plunger pin 18 of the floating cap unit within cylinder 1 is thus coaxially disposed in abutting relation to the valve core C of the tire valve. The floating cap unit, through the medium of the conically disposed fabric ring 20 which engages the inner wall of the cylinder 1, seals the tire valve. This floating cap unit in conjunction with the housing assembly thereabout will prevent escape of inflating fluid from the tire valve. In the event the tire valve should leak, due to depression of the valve core, the escaping fluid will engage the internal surface of conically disposed ring 20 to expand it to positively seal across the passage through the cylinder 1.

If the radially projecting ring 15 is grasped manually with tools in efforts to remove the valve lock cap, it locks against release from the tire valve due to the adjacent end to end relation of the inner end of the cylinder 1 to the inner shoulder provided by the internally reduced portion of the housing 12. If the sleeve 9 which encloses cylinder 1 should be grasped in attempts to remove the lock cap, the sleeve merely rotates relative the cylinder 1 and the housing 12 and no disengagement of the cap from the tire valve would be effected. If a tool which did not precisely fit the opening 7 were applied in attempts to remove the cap, it would be unable to rotate the cylinder 1, which is a necessary preliminary for the removal of the lock cap unit. Further, if a person should attempt to depress the valve pin 18 in efforts to deflate the tire, on engagement of the pin 18 to open the tire valve the fluid released by the tire valve would engage the floating washer 20 and move the floating cap unit until the shoulder on pin 18 engages flange 6 of the cylinder 1 whereupon the ring 20 will conically expand and seal to the inner walls of the cylinder 1. The released fluid could not escape through the lock cap.

For proper removal of the lock cap, the mating extension 32 of the wrench 30 is inserted in the specially formed and dimensioned opening 7 in the outer end of cylinder 1 and the cylinder 1 is thereby unscrewed from the tire valve. Then the housing 12 is unscrewed therewith to complete the removal of the entire lock cap unit.

The provision for the radially projecting ring 15 serves two purposes. One, it provides means for easily screwing the housing 12 to a valve, such as shown in the drawings, and, secondly, it may serve to prevent removal of a hub cap in certain automobile wheel assemblies when the lock cap is in its locked position to the tire valve. Its function in this respect appears to require no further detailed description.

The advantageous nature of the improved valve lock cap assembly as provided by the invention is thus readily apparent particularly with respect to its application to the inflating valves of pneumatic tires and tubes as described herein. Its application, of course, is considerably wider than indicated in the limited field presented in this application. This will be readily apparent to those versed in the art.

From the above description it will be readily apparent that there is thus provided a device of the character described possessing the particular features of advantage before enumerated as desirable, but which obviously is capable of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to specific features shown, but that the means and construction herein disclosed comprises the preferred form of several modes of putting the invention into effect, and the invention is therefore claimed in any forms or modifications within the legitimate and valid scope of the appended claims.

Having thus described my invention, I claim:

1. A valve lock cap in combination with an inflating valve or the like comprising a first housing, a second housing removably attached to said valve and rotatably retaining the first housing with the first housing completely within the second housing and having means preventing removal of said first housing therefrom, said first housing including means for attachment thereof to the valve, said second housing thus being prevented from removal from the valve due to the fact that said first housing is attached to the valve and is normally inaccessible within said second housing, said second housing comprising two relatively rotatable interconnected sleeves, key means engageable with the first housing for detaching the first housing from the valve for removal of both housings from the valve, and means floatingly contained within at least one of said housings in continuously capping relation to said valve.

2. A valve lock cap in combination with an inflating valve stem or the like including a housing assembly consisting of an outer shell and an inner shell rotatably retained within said outer shell and axially adjustable relative thereto, the outer shell comprising two relatively rotatable sleeves which completely enclose the inner shell, one of said sleeves and the inner shell being in conjoint engagement with the valve stem, thus attaching the cap to the valve stem, and means floating within said shells and in sliding engagement with one of the shells for effecting a one way valve in continuously capping relation to the valve stem.

3. A valve lock cap in combination with an inflating valve including a housing assembly consisting of an outer shell and an inner shell rotatably mounted within said outer shell and axially adjustable relative thereto, said shells having coaxial valve engaging means in conjoint locking engagement thereof with the valve, means floating within said shells for effecting a one-way valve in continuously capping relation to the inflating valve on application of the housing assembly thereto, and a sleeve held between said shells and freely rotatable relative thereto, said sleeve and outer shell completely enclosing said inner shell thereby preventing removal of said housing assembly from the inflating valve by external engagement of said shells.

4. A valve lock cap in combination with an inflation valve including a housing assembly consisting of an outer shell of fixed dimension and an inner shell rotatably mounted within said outer shell and axially adjustable relative thereto, said shells having coaxial valve engaging means in conjoint locking engagement with said valve, movable valve capping means within said shells, and cover means freely rotatably attached to said shells, said outer shell and said cover means completely enclosing said inner shell.

5. A valve lock assembly in combination with an inflating valve including a valve operator comprising an outer shell, an inner shell rotatably contained within said outer shell and axially adjustable relative thereto, the outer shell comprising two relatively rotatable sleeves which completely enclose the inner shell, one of said sleeves and the inner shell being in conjoint locking engagement with the valve stem, thus attaching the cap to the valve stem, the outer shell having an opening leading to the inner shell, means movable through said opening engageable with said inner shell for locking and unlocking the inner shell with respect to the valve, a floating plunger in said shells constituting means for operating said valve operator and a flexible washer about said plunger transversely sealing said shells and the valve to which it is applied.

6. A valve lock cap in combination with an inflating valve or the like comprising a first housing threadedly engaging about the valve, a second housing threadedly engaging about the valve in adjacent locking relation with the valve and engaged portion of said first housing, a sleeve freely rotatable about said second housing and retained thereon by said first housing, said second housing being completely enclosed by said first housing and said sleeve and having means for sealing the valve against leakage, said first housing having means preventing disengagement of said cap from the valve until said second housing is disengaged therefrom.

7. A hub cap lock in combination with an inflating valve or the like comprising a first housing threadedly engaging about the inflating valve, a second housing rotatably mounted about said first housing threadedly engaging about the valve in adjacent relation to the engaged portion of said first housing, means freely rotatable about said first housing in containing relation thereto and retained by said second housing, said second housing and said freely rotatable means completely enclosing said first housing, and means in sealing engagement with one of said housings for sealing the valve against escape of air therefrom but permitting inflation therethrough.

8. A valve safety lock cap in combination with an inflating valve of a pneumatic tire comprising first means threadedly engaging the valve, second means coaxially engaging the valve and the first means for locking said first and second means on said valve, third means rotatably mounted on said first and second means preventing disengagement of said first and second means from said valve by external grasping thereof, said second means being completely enclosed by said first and third means, and means in floating relation to said second means for sealing the valve to prevent escape of air therefrom but permitting inflation therethrough.

9. A valve safety lock cap in combination with an inflating valve of a pneumatic tire comprising first means threadedly engaging the valve, second means coaxially engaging the valve in locking engagement with said first means and said valve, third means rotatably mounted on said first and second means preventing disengagement of said first and second means from said valve by external grasping thereof, said second means being completely enclosed by said first and third means, means in said second means for sealing the valve to prevent escape of air therefrom but permitting inflation therethrough, said second means being provided with a key engagement surface portion and means for engaging internally of said third means the said key engagement surface portion of the second means for attachment and detachment of said second means with respect to said valve.

10. The structure as set forth in claim 9, said internal engaging means including a mating key element having an irregular projecting surface portion for internal engagement of said second means for selectively locking said cap to the valve or unlocking the cap, said key including means providing for ready application and retention thereof.

11. The structure as set forth in claim 9, said internal engaging means including a cylindrical body element providing a key means, one end of said body element having a projection with multi-planar peripheral surfaces, an expanded central portion of said body being provided with engaging means on the surface thereof for ready application of the body projection to the irregular internal surface of said second means for locking or unlocking of the valve lock cap, and a groove in the other end of said body having a spring clip means engaged therein and extending axially relative said body.

12. A valve safety lock cap in combination with an inflating valve of pneumatic tires comprising first means threadedly engaging the inflating valve, second means coaxially attached to the valve, third means rotatably engaging said first and second means, the second and third means completely enclosing the first means, the third means having an opening leading to said first means, floating sealing cap means within and engaging said first means, and a key element movable through said opening of the third means and engageable with the first means for threaded movement thereof, the sealing cap means also being engageable and operable by access through said opening.

13. A valve lock cap in combination with an inflating valve comprising, a cylinder engaging about the inflating valve at one end, a valve operating plunger floating therein, a flexible ring about said plunger guiding it within said cylinder providing a one-way valve therein, said engaging end of said cylinder being radially expanded, a flanged sleeve rotatably mounted about and completely enclosing the outer end of said cylinder and in abutting relation to the shoulder provided by the radial expansion thereof, a housing rotatably containing a flange portion of said sleeve at one end and the expanded end of said cylinder and having means at the other end positively engaging the inflating valve and providing for axial adjustment of said cylinder relative said housing.

14. The structure as set forth in claim 13 and the outer end of said cylinder being internally shaped to an irregular configuration for engagement of a locking key thereto.

15. The structure as set forth in claim 14 and a key element having a mating irregular configuration for locking said cylinder and said housing to the valve.

16. A valve lock cap in combination with a valve such as an inflating valve including means engaging about the valve to provide a valve extension, means in said valve extension to continuously seal the valve, and container means completely enclosing said extension and having coaxial valve engaging means, said container means comprising two relatively rotatable interconnected sleeves freely enclosing said extension and thereby preventing external grasping of the extension for removal thereof from the valve.

17. The structure as set forth in claim 16 including hub cap lock means fixed to said container means and extending therefrom.

References Cited in the file of this patent

UNITED STATES PATENTS

| | | |
|---|---|---|
| D. 45,165 | Warren | Jan. 13, 1914 |
| 1,049,971 | Appleby | Jan. 7, 1913 |
| 1,185,684 | Kraft | June 6, 1916 |
| 1,408,959 | Royer | Mar. 7, 1922 |
| 1,473,938 | Royer | Nov. 13, 1923 |
| 2,677,388 | Neff | May 4, 1954 |
| 2,747,940 | Tracy | May 29, 1956 |
| 2,778,215 | Redmond | Jan. 22, 1957 |
| 2,812,000 | Trinca | Nov. 5, 1957 |
| 2,820,503 | Millat | Jan. 21, 1958 |

FOREIGN PATENTS

| | | |
|---|---|---|
| 23,091 | Great Britain | Nov. 20, 1899 |
| 7,949 | Australia | Apr. 7, 1933 |